United States Patent
Hutchings et al.

(10) Patent No.: US 8,891,111 B2
(45) Date of Patent: Nov. 18, 2014

(54) ADAPTABLE PRINTER DRIVER

(75) Inventors: Justin Hutchings, Issaquah, WA (US);
Feng Yue, Sammamish, WA (US);
Frank Gorgenyi, Bremerton, WA (US);
Michael Fenelon, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 12/966,840

(22) Filed: Dec. 13, 2010

(65) Prior Publication Data

US 2012/0147414 A1   Jun. 14, 2012

(51) Int. Cl.
*G06F 3/12* (2006.01)
*G06F 9/44* (2006.01)

(52) U.S. Cl.
CPC ............ *G06F 9/4411* (2013.01); *G06F 3/1285* (2013.01); *G06F 3/1204* (2013.01); *G06F 3/1225* (2013.01)
USPC ...................................... 358/1.15

(58) Field of Classification Search
CPC ....... G06F 3/1204; G06F 3/12; G06F 3/1225; G06F 3/1285
USPC ...................................... 358/1.15
See application file for complete search history.

(56) References Cited

U.S. PATENT DOCUMENTS

| | | | |
|---|---|---|---|
| 5,768,583 A | 6/1998 | Orzol et al. | |
| 6,538,763 B1 | 3/2003 | Klosterman et al. | |
| 6,549,221 B1 * | 4/2003 | Brown et al. | 715/854 |
| 6,825,941 B1 | 11/2004 | Nguyen et al. | |
| 7,940,407 B2 * | 5/2011 | Suzuki et al. | 358/1.15 |
| 8,396,409 B2 * | 3/2013 | Azami et al. | 399/389 |

(Continued)

FOREIGN PATENT DOCUMENTS

| | | |
|---|---|---|
| CN | 1624648 A | 6/2005 |
| CN | 101727340 A | 6/2010 |

OTHER PUBLICATIONS

Networking Solutions: http://www.business-solutions.epson.co.uk/Networking%20Solutions_Management.html Published: Feb. 23, 2006, 3 pages.

(Continued)

*Primary Examiner* — Jeremiah Bryar
*Assistant Examiner* — Quyen V Ngo
(74) *Attorney, Agent, or Firm* — Tim Churna; Kate Drakos; Micky Minhas

(57) ABSTRACT

Some embodiments of the invention provide techniques whereby a printer driver may be modified and supplemented over time. For example, a framework may be provided which enables a printer driver's functionality to be supplemented over time to include new and/or enhanced features, such as features relating to the manner in which the capabilities of a printer are configured, print settings are manipulated, information is presented to users, print-related system events are handled, etc. In some embodiments, one or more components (which may be included in a print subsystem provided by an operating system of a computing device, in a printer driver, and/or some other system element) may be configured to automatically seek and acquire configuration data from any of various sources, including the printer device, one or more online sources, and/or other sources.

20 Claims, 3 Drawing Sheets

(56) References Cited

U.S. PATENT DOCUMENTS

| | | |
|---|---|---|
| 2002/0067504 A1* | 6/2002 | Salgado et al. ............ 358/1.15 |
| 2002/0078200 A1 | 6/2002 | Helms |
| 2003/0103224 A1 | 6/2003 | Johnson et al. |
| 2004/0193745 A1 | 9/2004 | Olbricht |
| 2006/0244986 A1* | 11/2006 | Ferlitsch .................. 358/1.13 |
| 2008/0055640 A1* | 3/2008 | Takahashi et al. ......... 358/1.15 |
| 2008/0123130 A1 | 5/2008 | Matsumoto et al. |
| 2009/0128849 A1* | 5/2009 | Sakura ..................... 358/1.15 |
| 2009/0251730 A1* | 10/2009 | Yamaguchi ............... 358/1.15 |
| 2009/0257080 A1* | 10/2009 | Herrmann et al. ......... 358/1.15 |

OTHER PUBLICATIONS

Office Action; CN App. No. 201110414191.2; mailed Feb. 8, 2014; 14 pages, including Concise Explanation of Relevance and/or partial translation.

"Second Office Action Issued in Chinese Patent Application No. 201110414191.2", Mailed Date: Sep. 3, 2014, 6 pages.

* cited by examiner

ADAPTABLE PRINTER DRIVER

FIELD OF THE INVENTION

This invention relates generally to device drivers, and more particularly to printer drivers.

BACKGROUND

A device driver is a body of software code that often enables one or more higher-level software applications to interact with a hardware device. Often, a device driver accepts generic commands from a higher-level application with which a user interacts, and translates the commands into lower-level commands that the printer device being driven is configured to process. By acting as a translator, the device driver can simplify the programming of higher-level applications, since those applications need not be programmed to issue commands in the lower-level languages that devices process. A device driver may also provide a standardized interface through which higher-level applications may invoke a device's functions.

A printer driver is a body of software code that enables higher-level applications to invoke the functions provided by a printer device. Typically, a printer driver provides functionality that may be broadly categorized as rendering, configuration and user experience functionality. Briefly, rendering functionality provided by a printer driver translates information that is generated when a print job is initiated to commands and data that comply with a page description language (PDL) that the printer device is configured to process. Configuration functionality enables a higher-level program to configure and view configuration aspects of a printer device, such as the paper sizes the printer device supports, whether color printing is supported, etc. User experience functionality manages the presentation of information by the printer device to a user during print operations, such as to let the user know that a print job has commenced or completed, that ink supplies are low, etc.

Conventionally, a printer driver comprises a body of code that draws upon a static set of configuration files. The references to the configuration files are hard-modified and re-tested. In addition, because the code that comprises a printer driver is generally written in a language that is compiled prior to execution, the printer driver is specific to a particular processor architecture (e.g., a 32-bit architecture, 64-bit architecture, etc.) in which compilation occurs. As a result, if a user employs a particular printer brand and model and a computing device executing a particular operating system and having a particular processor architecture, a printer driver that is designed specifically for that combination of components is needed to enable the computing device and printer device to interoperate. Given the proliferation of computing devices, operating systems and architectures in the marketplace, and the general assumption on the part of the user community that a computing device will be capable of printing, a large number of printer drivers are in use in the marketplace. Each driver must be managed by its supplier, which is often an independent hardware vendor with core competencies that lean much more heavily toward building user-friendly hardware devices than toward developing printer driver code that executes flawlessly under a host of different operating systems executing under different processor architectures.

SUMMARY

Some embodiments of the invention provide techniques whereby a printer driver may be modified and supplemented over time. For example, some embodiments provide a framework that allows a printer driver's functionality to be supplemented over time to include new and/or enhanced features. These features may, for example, relate to the manner in which the capabilities of a printer are configured, print settings are manipulated, information is presented to users, print-related system events are handled, etc. Any of numerous types of printing-related functionality may be provided.

In some embodiments, one or more components (which may be included in a print subsystem provided by an operating system of a computing device, in a printer driver, and/or some other system element) may be configured to automatically seek and acquire configuration data from any of various sources. The component(s) may incorporate any acquired configuration data into the printer driver, so that its functionality may be extended and enhanced over time. The sources of configuration data may include, as examples, the printer device, online sources, and/or other sources. For example, the component(s) may be configured to periodically query the printer device, online sources and/or other sources for configuration data that relates to a particular printer device, and if found, incorporate the newly acquired configuration data into an existing printer driver, to provide enhanced print-related capabilities. As a result, the printer driver may begin supporting more and more advanced printing features over time to reflect and capitalize on more capabilities of the printer device, even though the user may not have taken any action to improve or enhance it.

Embodiments of the invention may also provide processes for resolving overlap and/or conflict between configuration data that is acquired from multiple sources. For example, some embodiments may provide programmed logic for resolving overlap or conflict, which may be implemented via one or more scripting languages (e.g., Javascript) so that the programmed logic need not be compiled prior to execution, and thus is suitable for execution under a host of different processor architectures. Of course, not all embodiments of the invention are limited to an implementation wherein overlap and/or conflict resolution logic is coded using one or more scripting languages that need not be compiled prior to execution. For example, overlap and/or conflict resolution logic code may be interpreted but not compiled, "Just-In-Time" compiled, or employed in any other suitable manner, as embodiments of the invention are not limited in this respect.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Some embodiments of the invention provide a framework which enables printer driver functionality to be modified, supplemented and/or enhanced over time. For example, some embodiments provide components (which may be incorporated in a print subsystem, in the printer driver, or some other location) configured to seek and acquire configuration data from any of various sources, and incorporate any configuration data found into the printer driver, so that the printer driver's functionality may be extended and enhanced over time.

In some embodiments, a "base" printer driver providing only a relatively rudimentary set of print-related features (e.g., support for a minimal number of paper sizes, such as letter and A4; support for only black and white printing; no advanced features like duplex printing, etc.) may be "shipped" (e.g., included with an operating system for a computing device, provided with a printer device, and/or distributed in some other manner) to provide functionality for use with a large portion of legacy printer devices, thereby enabling users to accomplish basic printing tasks. However, one or more components (e.g., included in the print subsystem of an operating system of the computing device, in the printer driver, and/or any other system element(s)) may be configured to seek and acquire new configuration data from any of various sources as it is made available by those sources. The sources may include, for example, the printer device, online sources, and/or one or more other sources. Once new configuration data is located that corresponds to the considered printer device, that configuration data may be incorporated into the printer driver, thereby reflecting, and capitalizing upon, more capabilities of the printer device and enriching the user's print-related experience, even though the user may have taken no overt action to upgrade the printer driver.

Figure 1:
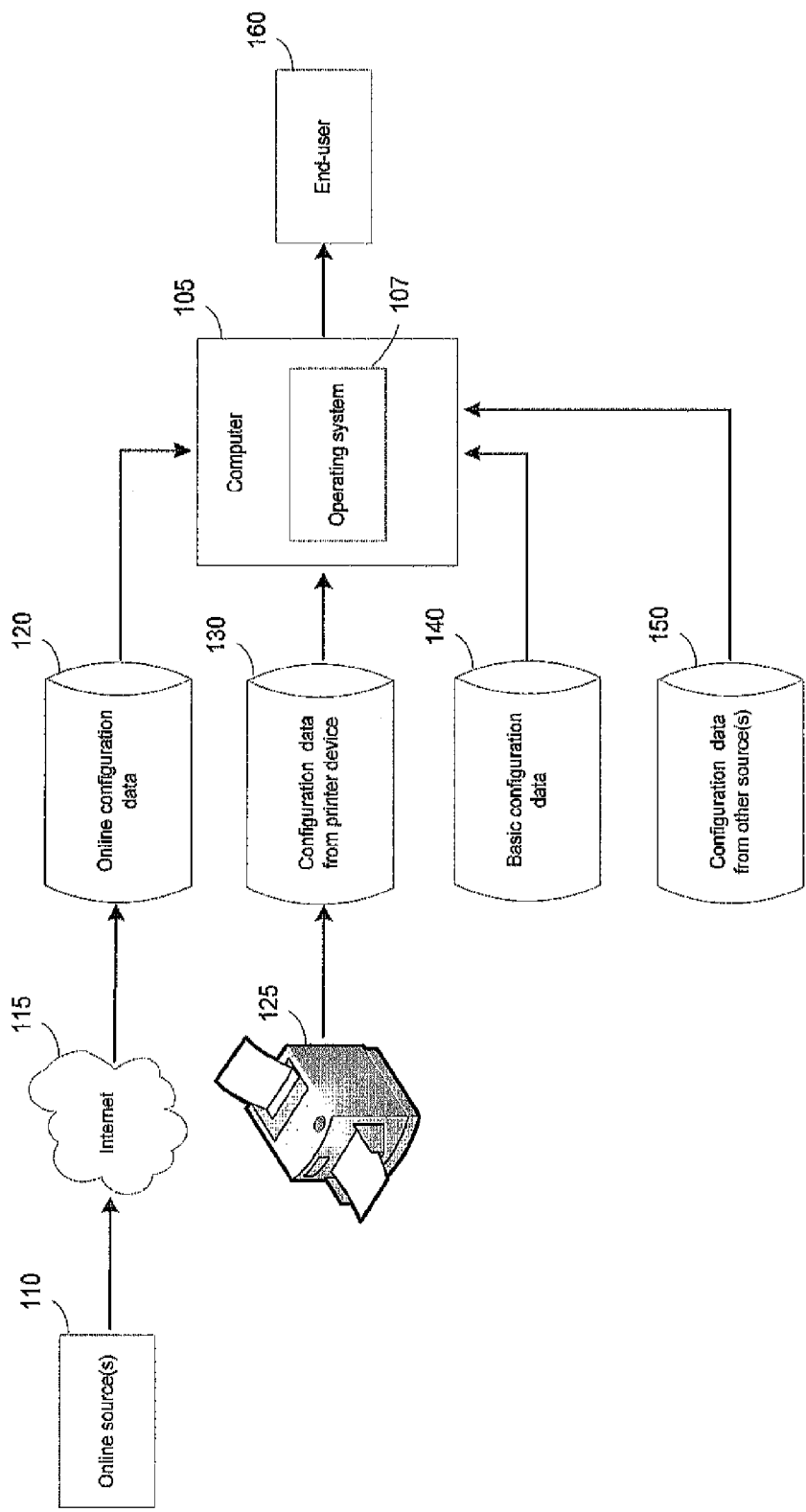
FIG. 1 is a block diagram depicting system components which may acquire and/or provide configuration data, in accordance with some embodiments of the invention.

FIG. 1 depicts example system components and techniques whereby new configuration data may be acquired from one or more sources for incorporation into a printer driver. In the example shown in FIG. 1, computer 105, executing operating system 107, acquires configuration data from a plurality of sources, including online source(s) 110, printer device 125, basic configuration data 140 and other source(s) 150. It should be appreciated that these sources of configuration data are merely exemplary, and that any of numerous sources of configuration data may be employed, as embodiments of the invention are not limited in this respect.

In the example shown in FIG. 1, computer 105 acquires basic configuration data 140. For example, basic configuration data 140 may be received on a storage medium, such as a storage medium storing data used to install and/or enhance operating system 107, or which is shipped with printer device 125. Of course, embodiments of the invention are not limited to the implementation shown in FIG. 1. For example, in some embodiments, basic configuration data 140 need not be acquired by computer 105, as it may be stored locally on computer 105 (e.g., shipped with computer 105, such as via incorporation into a printer driver and/or operating system also shipped with computer 105). If acquired, basic configuration data need not be provided on a storage medium, as it may be acquired from one or more online sources (e.g., an online driver store). Basic configuration data 140 may be acquired and/or made accessible by computer 105 in any suitable fashion, as embodiments of the invention are not limited in this respect.

This basic configuration data may support a rudimentary feature set designed to allow computer 105 to interoperate with a large population of printer devices. For example, the configuration data may enable basic print features that a large population of legacy printer devices provide, such as black and white printing, limited paper sizes, and no advanced features such as duplex printing. As a result, the inclusion of this basic configuration data into a printer driver used by computer 105 may enable it to interoperate with a large population of devices and provide a basic set of printing features. Of course, embodiments of the invention may provide any of numerous types of configuration data, supporting any of numerous types of printing features.

In the example of FIG. 1, another source of configuration data for the printer driver is printer device 125. Any of numerous techniques may be used by computer 105 to acquire configuration data from printer device 125. In some embodiments of the invention, computer 105 may employ one or more printer device communication protocols, whether known (e.g., WS-PRINT, SNMP, etc.) or later developed, to issue queries to printer device 125 and receive configuration data back in response to these queries.

In some embodiments of the invention, one or more conventional printer device communication protocols may be extended to enable computer 105 to issue queries to a printer device. In this respect, while conventional printer device communication protocols enable a computer to obtain basic, rudimentary information about the status of a printer device (e.g., how much ink it has available for printing, which paper bins are installed, etc.), some embodiments of the invention extend these conventional protocols to allow a computer to obtain additional and more sophisticated types of information regarding the printer device's capabilities. For example, conventional protocols may be extended to enable a computer to obtain such information as whether the printer device supports borderless printing, the details of an installed duplexer unit, the media sizes its supports, etc. Any of numerous types of information may be acquired from the printer device, relating to any of numerous features, indications of status, or capabilities, as embodiments of the invention are not limited in this respect.

In the example of FIG. 1, computer 105 also obtains online configuration data 120 from one or more online sources 110. Specifically, in the example depicted, computer 105 obtains online configuration data 120 via Internet 115. However, it should be appreciated that online configuration data need not be obtained from sources accessible via the Internet or any other one or more public communications networks, and may be obtained from sources accessible via any network(s), including public and/or private networks that employ any suitable communications infrastructure and/or protocol(s). Embodiments of the invention are not limited in this respect.

In some embodiments of the invention, online configuration data 120 may be obtained by one or more automated procedures executing on computer 105. For example, one or more automated procedures which comprise part of an operating system of computer 105 may be configured to obtain configuration data from online sources, as well as information that may be incorporated into the operating system and/or any applications executing on computer 105. Further, the one or more components may be configured to process information received from peripheral devices connected to computer 105 such as printer device 125. This information may include, for example, the brand and model of printer device 125. Using this information, the one or more components may query an online source 110 to identify configuration data that relates to printer device 125. Of course, embodiments of the invention are not limited to such an implementation, as online sources 110 may be queried in any suitable fashion. For example, one or more web sites or other online sources (e.g., made available by an independent hardware vendor) may be queried manually (e.g., by a user of computer 105) to obtain configuration data applicable to printer device 125. If one or more automated procedures are used to obtain configuration data, the automated procedure(s) need not be included in an operating system of computer 105, and may be implemented in any suitable fashion, as embodiments of the invention are not limited in this respect.

In the example of FIG. 1, configuration data 150 is also obtained by computer 105 from one or more additional sources. The additional source(s) may be currently known or later developed, and may provide any of numerous types of configuration information. For example, new sources of configuration data may be developed and implemented over time, to provide new types of configuration data, provide new ways of obtaining configuration data from various sources, manage print operations, and/or perform any of numerous other printing-related functions. For example, if a new device communication protocol were developed or enhanced to enable computer 105 to obtain configuration data from printer device 125, then the new protocol may be provided to computer 105 as part of configuration data 150, and incorporated by computer 105 into its printer driver so that the printer driver may employ the new device communication protocol to retrieve information from printer device 125.

In another example, configuration data 150 may provide a capability whereby print operations may be managed, such as by an administrator or other user. For example, configuration data 150 may include instructions and/or data which, when incorporated into a printer driver on computer 105, may enable an administrator to impose restrictions on certain types of print jobs. For example, an administrator in a business setting may impose restrictions on print jobs so that certain users must print in duplex mode to save paper, to allow color printing only in select circumstances, etc. Any of numerous types of information relating to the manner in printing is performed may be included in configuration data 150 and incorporated into a printer driver, as embodiments of the invention are not limited in this respect.

In some implementations, configuration data may only be available from a subset of the sources depicted in FIG. 1. For example, a lack of network access (e.g., because a home user does not have Internet access, because of security concerns, etc.) may prevent computer 105 from accessing online sources 110 and thus online configuration data 120. As a result, computer 105 may only have access to local configuration data 140, and configuration data 130 provided by printer device 125. Configuration data may be obtained from any one or more of the sources depicted in FIG. 1, as embodiments of the invention are not limited to any implementations where all sources of configuration data are available.

Figure 2:
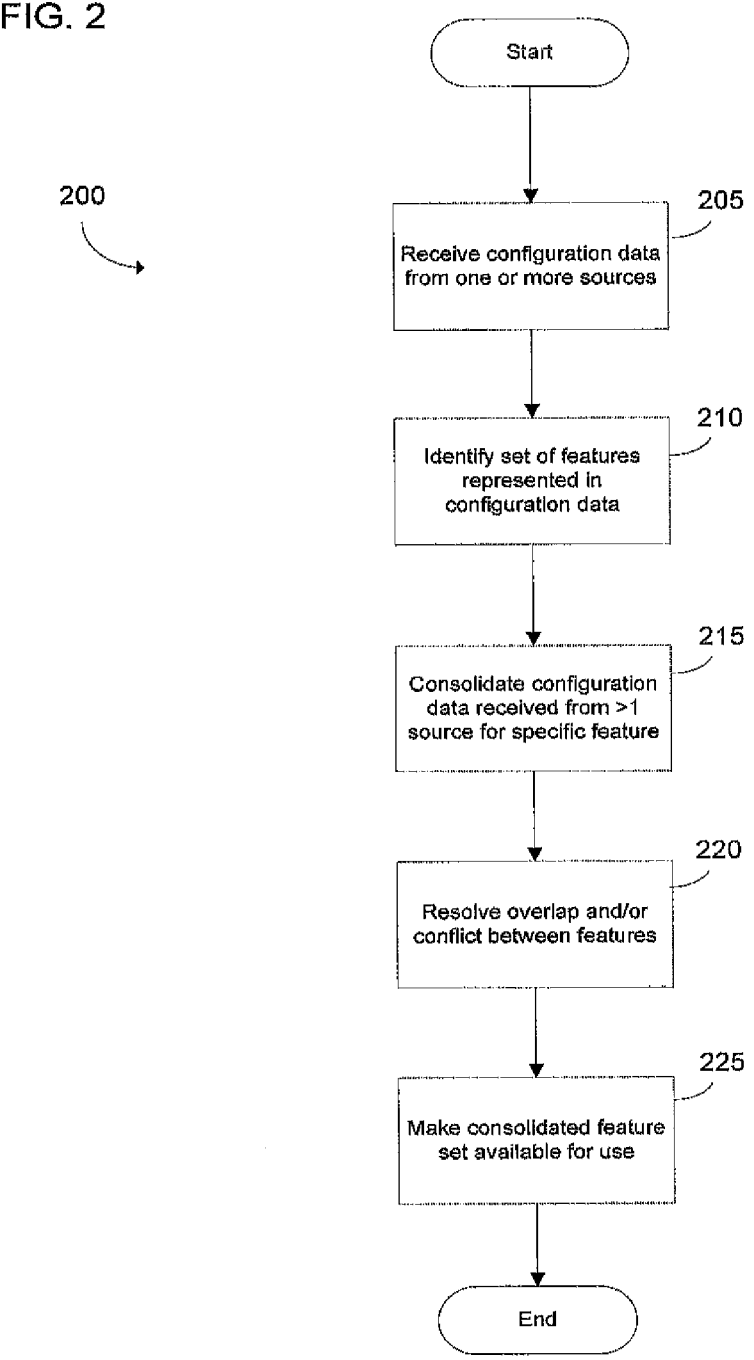
FIG. 2 is a flow chart depicting an example process whereby configuration data acquired from multiple sources is combined, in accordance with some embodiments of the invention.

When configuration data is acquired from various sources, it may be incorporated into of a printer driver. Example process 200 for creating consolidated configuration data for use by computer 105 is shown in FIG. 2.

At the start of process 200, configuration data is received from one or more sources (e.g., those shown in FIG. 1, and/or one or more other sources) in act 205. Configuration data may be received in any of numerous forms, as embodiments of the invention are not limited in this respect. For example, in some embodiments of the invention, configuration data is received in the form of files containing data in the PostScript printer description (PPD) and/or generic printer description (GPD) format. In this respect, PPD and GPD files are conventionally used to describe the capabilities of a particular printer device, or a class of printer devices that share one or more characteristics, to an operating system of a computer which interoperates with a printer device. Example capabilities may include the paper sizes supported by the printer device, whether duplex printing is supported, the colors in which printing may be performed, etc. Of course, embodiments of the invention are not limited to employing PPD and/or GPD files, as any of numerous types of information relating to the capabilities of a printer device or class of printer devices may be described in any suitable manner and using any suitable format(s).

Process 200 then proceeds to act 210, wherein the set of features represented in the configuration data received from the one or more sources is identified. Identification of the individual features represented may be performed in any suitable manner. For example, programmed logic may be employed to identify features.

Process 200 then proceeds to act 215, wherein configuration data, received from more than one source for a specific feature identified in act 210, is consolidated. This may be performed in any suitable fashion, and the technique used may vary for different features. For example, for some features, the configuration data from one source may supplement the configuration data received from another source. For example, if the feature in question is the paper sizes which a printer device supports, and one configuration data source specifies that two paper sizes are supported and another configuration data source specifies that five other paper sizes are supported, then consolidation in act 215 may involve merging the paper sizes specified by the two sources to indicate that seven paper sizes are supported.

In another example, configuration data for a feature that is received from one source may be chosen for use over configuration data for the feature that is received from another source. For example, configuration data for a feature which specifies that it is more specific to a printer device may be selected for use over configuration data for a feature which specifies that it is less specific to a printer device. Specificity may be determined in any of numerous ways. For example, in some embodiments, specificity may be determined by the source itself. Using the configuration data sources shown in FIG. 1 to illustrate, online configuration data 120 received from online sources 110 may be designated as the most device-specific configuration data source, followed by configuration data 130 received from printer device 125, followed by local configuration data 140 stored on computer 105. By designating online configuration data 120 from online sources 110 as the most device-specific configuration data source, embodiments of the invention may allow for more flexible adaptation of a printer driver's configuration over time, since an online source 110 may be updated more frequently with new configuration data than printer device 125. Of course, specificity to a printer device need not be used to determine which configuration data is chosen for use over other configuration data, and if specificity is used, it need not be determined based on the source of the configuration data. Indeed, consolidation of configuration data in act 215 need not be performed by either merging data from different sources or choosing one set of configuration data over another, as described above. Any of numerous techniques may be employed, as embodiments of the invention are not limited in this respect.

Process 200 then proceeds to act 220, wherein any overlaps and/or conflicts between different features are resolved.

Overlap and/or conflict may arise, for example, because one feature may only be employed when another feature is enabled, disabled, in a certain setting, etc. In one example, configuration data acquired for one feature, which specifies the paper sizes that a printer device supports, may indicate that the printer device is capable of printing on paper sizes which include 5"×7" and 8.5"×11" paper, and configuration data for another feature, which specifies whether the printer device supports borderless printing feature, may indicate that the printer device is capable of borderless printing. However, the printer device may only be capable of borderless printing on 5"×7" paper, and not on 8.5"×11" paper, so that conflict between the paper sizes and borderless printing features should be resolved. In another example, if configuration data acquired from an online source indicates that the printer device supports duplex printing if a duplexer unit is installed, and configuration data received from the printer device indicates that the duplexer unit is not installed, then the conflict should be resolved so that the user is not presented with duplex printing options.

Embodiments of the invention may resolve overlap and/or conflict between features in any of numerous ways. In some embodiments, programmed logic is provided to resolve overlap and/or conflict so that consolidated configuration data may be presented to the user. In some embodiments, this logic is programmed using one or more scripting languages (e.g., JavaScript and/or other scripting language(s)), so that the code comprising the logic need not be compiled prior to execution. As a result, some embodiments of the invention may provide a flexible tool for resolving overlap and/or conflict that may be executed on any suitable operating system and/or processor architecture. Of course, not all embodiments of the invention may be implemented in this manner. Any suitable tool(s) and/or technique(s) may be employed, as embodiments of the invention are not limited in this respect.

At the completion of act 220, process 200 proceeds to act 225, wherein consolidated configuration data is made available for use. This may be performed in any of numerous ways. In some embodiments, a printer driver may provide (e.g., when invoked by an application that initiates printing) a file, data stream, in-memory object model, and/or any other suitable data structure(s) (e.g., in extensible markup language (XML), and/or any other suitable format(s)) that describes the printer device's capabilities. Process 200 then completes.

Some embodiments of the invention may provide techniques whereby the presentation of a printer device's capabilities is iterative, so that as feature data that was employed in describing the printer device's capabilities in act 225 becomes obsolete and/or other changes occur, any conflicts that arise may be resolved. This may be performed in any of numerous ways. In some embodiments, a file provided to an application to describe a printer device's capabilities may include results generated via execution of routines (e.g., Javascript routines) which may provide the flexibility to account for any changes that may have occurred since the file was created. For example, if a file created in act 225 indicated that a printer device was capable of color printing, and then it is determined (e.g., using data provided by the printer device) that the printer device has run out of red ink, then results generated by a routine referenced by configuration data, and provided in the file, may enable presentation of an up-to-date feature set to the user, so that he/she knows that only black and white printing may commence until the red ink supply is replenished. Configuration data describing a printer device's current capabilities, and/or any changes to those capabilities, may be received from any of numerous sources, in any of numerous forms, and may be processed in any of numerous ways, as embodiments of the invention are not limited in this respect.

Figure 3:
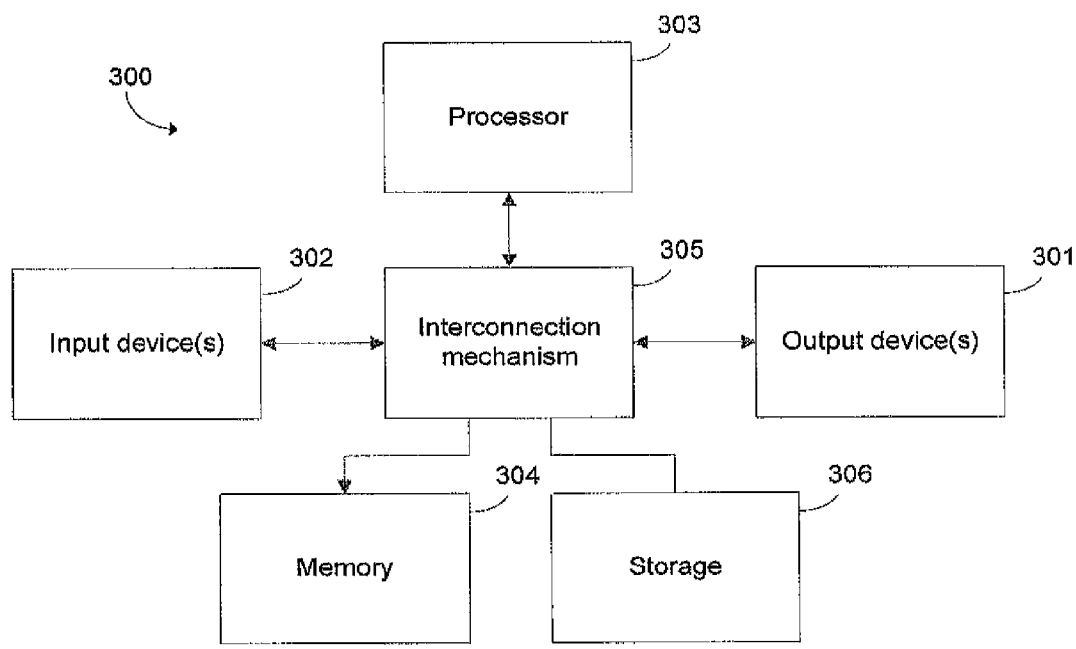
FIG. 3 is a block diagram depicting an example computer which may be employed to implement some embodiments of the invention.

Various aspects of the systems and methods for practicing features of the present invention may be implemented on one or more computer systems, such as the exemplary computer system 300 shown in FIG. 3. Computer system 300 includes input device(s) 302, output device(s) 301, processor 303, memory system 304 and storage 306, all of which are coupled, directly or indirectly, via interconnection mechanism 305, which may comprise one or more buses, switches, networks and/or any other suitable interconnection. The input device(s) 302 receive(s) input from a user or machine (e.g., a human operator), and the output device(s) 301 display(s) or transmit(s) information to a user or machine (e.g., a liquid crystal display). The input and output device(s) can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The processor 303 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

Figure 4:
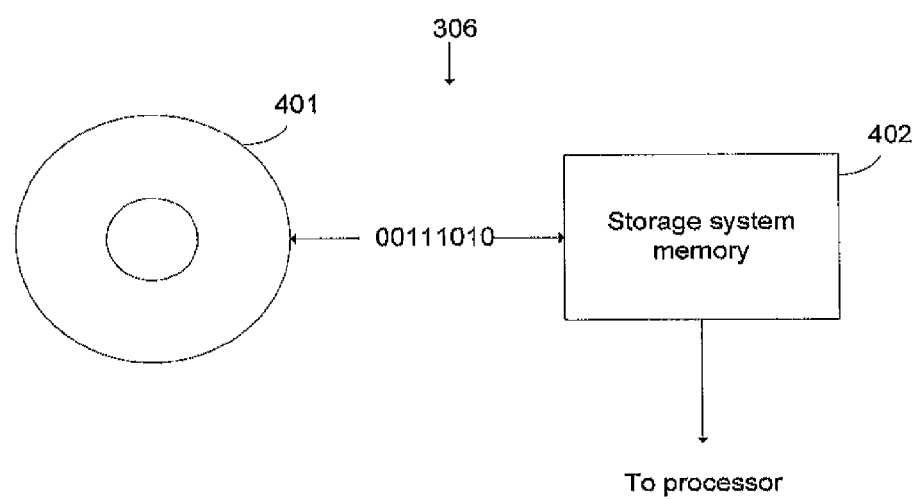
FIG. 4 is a block diagram depicting an example memory on which instructions embodying aspects of the invention may be recorded.

Processor 303 may also execute one or more computer programs to implement various functions. These computer programs may be written in any type of computer program language, including a procedural programming language, object-oriented programming language, macro language, or combination thereof. These computer programs may be stored in storage system 306. Storage system 306 may hold information on a volatile or non-volatile medium, and may be fixed or removable. Storage system 306 is shown in greater detail in FIG. 4.

Storage system 306 may include a tangible computer-readable and writable non-volatile recording medium 401, on which signals are stored that define a computer program or information to be used by the program. The recording medium may, for example, be disk memory, flash memory, and/or any other article(s) of manufacture usable to record and store information. Typically, in operation, the processor 303 causes data to be read from the nonvolatile recording medium 301 into a volatile memory 402 (e.g., a random access memory, or RAM) that allows for faster access to the information by the processor 303 than does the medium 401. The memory 402 may be located in the storage system 306 or in memory system 304, shown in FIG. 3. The processor 303 generally manipulates the data within the integrated circuit memory 304, 402 and then copies the data to the medium 401 after processing is completed. A variety of mechanisms are known for managing data movement between the medium 401 and the integrated circuit memory element 304, 402, and the invention is not limited to any mechanism, whether now known or later developed. The invention is also not limited to a particular memory system 304 or storage system 306.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers and/or systems. Such processors may be implemented as integrated circuits, with one or more processors in an integrated circuit component, though a processor may be implemented using circuitry in any suitable format.

It should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should also be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual environment.

In this respect, the invention may be embodied as a computer-readable medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in the illustrative embodiments described herein.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. At least one computer-readable memory having instructions stored thereon which, when executed, perform operations for driving a printer device with a computing device, the operations comprising:
   determining that new configuration data for adding a new feature to a printer driver and/or for enhancing an existing feature of the printer driver has been made available by any of a plurality of sources, the plurality of sources comprising the printer device and at least one online source;
   obtaining the new configuration data from at least one of the plurality of sources;
   consolidating the new configuration data obtained from at least one of the plurality of sources with other configuration data from another source, the new configuration data and other configuration data being for a same type of feature; and
   using the consolidated configuration data to add the new feature to the printer driver and/or enhance the existing feature of the printer driver.

2. The at least one computer-readable memory of claim 1, wherein prior to the use of the consolidated configuration data, the printer driver is configured with a base configuration.

3. The at least one computer-readable memory of claim 2, wherein the base configuration of the printer driver enables the printer driver to interoperate with a plurality of types of printer devices.

4. The at least one computer-readable memory of claim 3, wherein the operations further comprise:
   employing at least one component, written in a scripting language to resolve a conflict relating to the new configuration data.

5. The at least one computer-readable memory of claim 1, wherein the new feature that is added and/or the existing feature that is enhanced relates to a manner in which one or more capabilities of the printer device are configured, one or more print settings for a print job are manipulated, or information relating to printing by the printer device is presented to a user.

6. The at least one computer-readable memory of claim 1, wherein the plurality of sources further includes an administrator.

7. The at least one computer-readable memory of claim 6, wherein the new configuration data specifies a restriction relating to printing by the printer device.

8. The at least one computer-readable memory of claim 1, wherein the operations further comprise:
   receiving the other configuration data from the other source.

9. The at least one computer-readable memory of claim 1, wherein consolidating the new configuration data with other configuration data comprises:
   resolving an overlap and/or conflict between features specified by the new configuration data and the other configuration data.

10. The at least one computer-readable memory of claim 1, wherein the operations further comprise:
    making the consolidated feature that has been added and/or the existing feature that has been enhanced available for use by an application operable to print.

11. The at least one computer-readable memory of claim 1, wherein determining that new configuration data has been made available comprises:
    employing a printer device communication protocol to communicate with the printer device.

12. The at least one computer-readable memory of claim 1, wherein the at least one online source is accessible via the Internet.

13. A system, comprising at least one processor programmed to:
    determine that new configuration data for use by a printer driver in driving a printer device has been made available by any of a plurality of sources, the plurality of sources comprising a printer device and at least one online source;
    obtain the new configuration data from at least one of the plurality of sources;
    consolidate the new configuration data obtained from at least one of the plurality of sources with other configuration data from another source, the new configuration data and other configuration data being for a same type of feature; and
    use the consolidated configuration data to add one or more new features to the printer driver and/or enhance one or more existing features of the printer driver.

14. The system of claim 13, further comprising the printer device.

15. The system of claim 13, wherein the one or more new features that are added and/or the one or more existing features that are enhanced relate to a manner in which one or more capabilities of the printer device are configured, one or more print settings for a print job are manipulated, or information relating to printing by the printer device is presented to a user.

16. The system of claim 13, wherein the at least one processor is further programmed to:
    resolve an overlap and/or conflict in the new configuration data for at least two features.

17. The system of claim 13, wherein the at least one processor is further programmed to make the one or more new features that are added and/or the one or more existing features that are enhanced available for use by an application that prints.

18. A method for driving a printer device with a computing device, the method comprising:
    determining that new configuration data for adding a new feature to a printer driver of the computing device and/or for enhancing an existing feature of the printer driver of the computing device has been made available by any of a plurality of sources, the plurality of sources comprising the printer device and at least one online source;
    obtaining the new configuration data from at least one of the plurality of sources;
    consolidating the new configuration data obtained from at least one of the plurality of sources with other configuration data from another source, the new configuration data and other configuration data being for a same type of feature; and using the new configuration data to add the new feature to the printer driver of the computing device and/or enhance the existing feature of the printer driver of the computing device.

19. The method of claim 18, wherein the computing device is executing an operating system comprising at least one component, and wherein the method is performed by the at least one component.

20. The method of claim 19, wherein the at least one component forms part of a print subsystem of the operating system.

* * * * *